United States Patent Office 3,196,694
Patented July 27, 1965

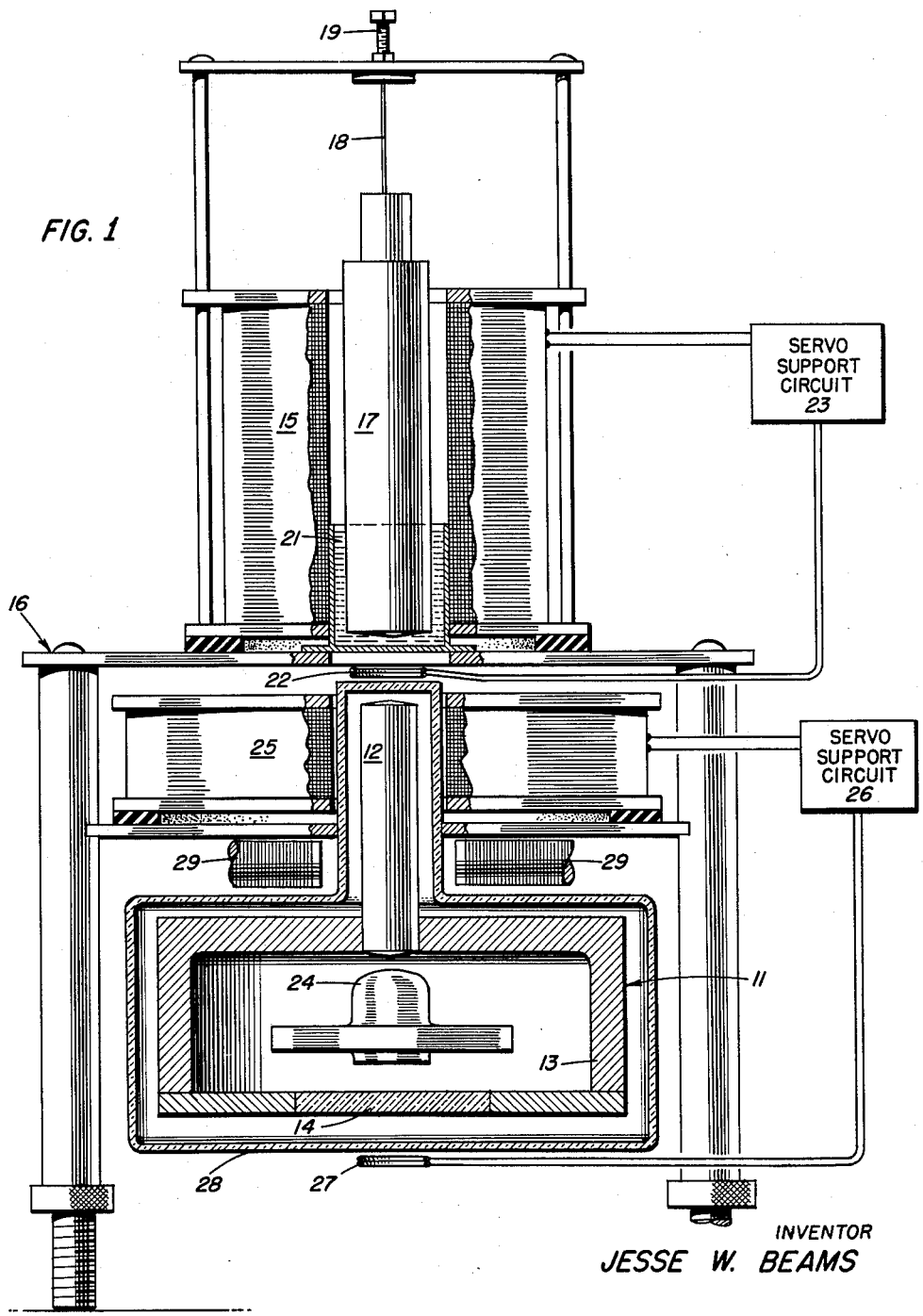

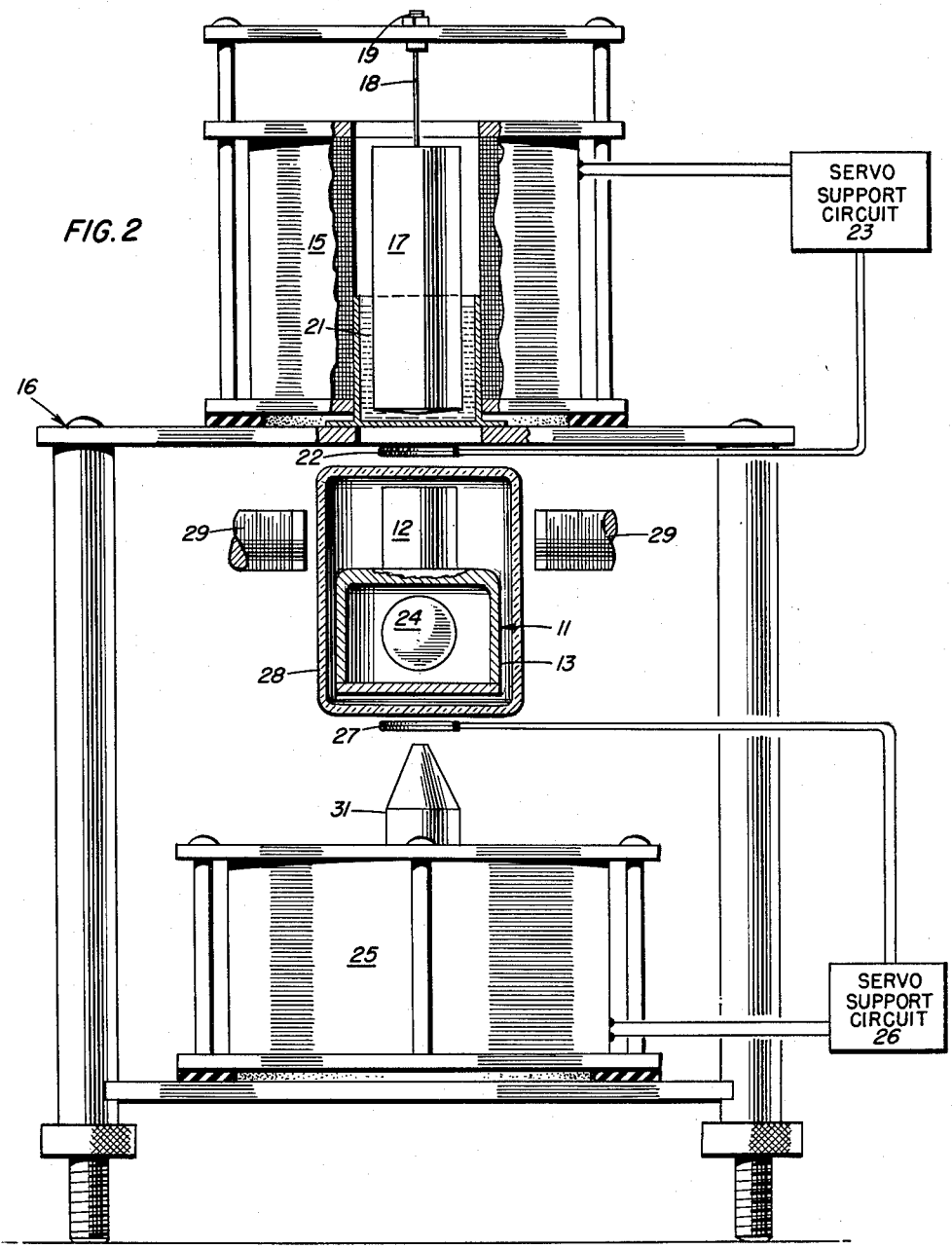

3,196,694
MAGNETIC SUSPENSION SYSTEM
Jesse W. Beams, Charlottesville, Va., assignor, by mesne assignments, to the United States of America as represented by the Secretary of the Navy
Filed Feb. 19, 1964, Ser. No. 346,051
4 Claims. (Cl. 74—5.37)

The present invention relates generally to magnetic suspension systems and more particularly to magnetic suspension of rotating bodies.

It is highly desirable for many diverse applications to have a freely rotating body, that is, one which will rotate at a constant speed. A magnetically suspended rotor spinning in a vacuum chamber will closely approximate an ideal free rotating body.

Patent No. 2,691,306, issued on October 12, 1954, for Magnetically Supported Rotating Bodies, by Jesse W. Beams et al. describes a mass of magnetic material freely suspended at atmospheric or reduced pressure, in a controlling magnetic field, to which a revolving magnetic field is applied to impart rotation. Of the numerous possible uses for such a device, those disclosed in the patent included; a gyroscope, material testing device, article coating device, and a laboratory test device.

Patent No. 2,733,857, issued on February 7, 1956, for Magnetically Supported Ultracentrifuge to Jesse W. Beams, illustrates an ultracentrifuge utilized for measuring molecular weights. The material to be centrifuged is placed within the rotor which is suspended magnetically in a vacuum. Rotational speed is applied to the rotor via an air turbine drive mechanism.

A free gyroscope, the axis of which remains fixed in space, is disclosed in Patent No. 3,041,482, issued on June 26, 1962, for Apparatus for Rotating Freely Suspended Bodies. One embodiment of this device discloses a spherical rotor of ferromagnetic alloys inclosed in a vacuum and suspended in a magnetic field. Rotory motion is imparted to the rotor by bombarding it with a beam of high speed particles.

At pressures between $1 \times 10^{-6}$ and $1 \times 10^{-7}$ torr (760 torr equals 1 atmosphere which equals 14.7 pounds per square inch), all of the frictional drag exhibited on the rotor is due to air friction. At pressures below $5 \times 10^{-8}$ torr, deceleration is contingent upon factors such as: residual air pressure; eddy current drag produced by magnetic fields perpendicular to the axis of spin, and rotation of the earth; the materials used for the rotor; currents in the apparatus surrounding the rotor; electrostatic charges on the rotor and vacuum chamber; faulty construction of apparatus other than the rotor; vibrations of the environment and earth; drift of the rotor; variations in rotor temperature; creep of the rotor materials; pressures of light on the rotor; radiometer effects and Brownian motion; variations in the direction of gravitational field; and gravitational radiation.

By carefully constructing the rotor so that the internal stress is slight, creep in the rotor material becomes negligible, and temperature changes can be compensated; and the effects of the pressure of light, radiometer effects, etc., have experimentally been determined to have negligible effect upon the speed. All other factors may be substantially reduced by freezing out the residual gases with liquid helium and carefully reducing the other effects.

Thus it is seen that drag upon the rotor is due primarily to air friction, construction of the rotor and construction of the suspension system. Therefore, by carefully constructing the rotor and suspension system and, if the suspension system and the chamber surrounding the rotor can be made to spin along with the rotor itself, at approximately the same speed as the rotor, deceleration can be made negligible. Mechanical suspension is obviously not a solution, since the system must be vibration free and mechanical bearings inherently introduce vibrations.

The present invention contemplates the use of a double magnetic suspension system in which one rotor, magnetically suspended, acts as magnetic suspension bearings for a second rotor. The first rotor, and a vacuum chamber, spin at the same speed or a speed close to that of the second rotor, thus eliminating all drag effects due to air pressure. Further, by careful construction, disturbances due to rotor, suspension, and other apparatus material, construction and interaction of elements are virtually eliminated. The device of the present invention finds utility in those applications in which the devices of the patents cited hereinbefore find utility. Additionally, because of the present invention's virtual freedom from factors causing deceleration thereof; it may be utilized as an ultrastable clock for timing events such as the time of flight of a missile and the like.

An object of the present invention is the provision of a suspension system for a rotating body which exhibits negligible deceleration.

A further object is the provision of a magnetic suspension system which will enable a body suspended thereby to rotate as an ideal free rotor.

Yet a further object of the present invention is the provision of a magnetic suspension system for a freely rotating body which will eliminate virtually all effects of deceleration under extremely low conditions of vacuum.

Various other objects, advantages and novel features of the invention will become apparent from the following detailed description of the invention when considered in conjunction with the accompanying drawings wherein:

FIG. 1 is a partially sectioned view of an embodiment of the present invention;

FIG. 2 is a view of another embodiment of the invention, shown in partial section.

Referring now to the drawings, wherein like reference characters designate like or corresponding parts throughout the several views, there is shown in FIG. 1 an outer rotor 11 having a ferromagnetic portion 12, and a "skirt" portion 13 which may be made of ferromagnetic material or may be made of a non-ferromagnetic material. The skirt has a non-conductive transparent window 14, made of a material such as quartz. A solenoid 15 is supported by an adjustable support means 16 which solenoid surrounds a core 17. The core in turn is suspended from support 16 by a wire 18, the length of which may be adjusted by turning adjustment screw 19. The core 17 hangs from support wire 18 as a pendulum, in a dashpot of viscous fluid 21.

Rotor 12 is suspended freely in space and any vertical motion imparted thereto is sensed by pickup coil 22 which is connected to a servo or support circuit 23, the output of which is in turn connected to the solenoid 15.

A second ferromagnetic rotor 24 is magnetically suspended within the skirt 13 of rotor 11. Surrounding the ferromagnetic portion 12 of rotor 11 is a second solenoid 25, also supported by member 16, which is energized by current from a second servo-support circuit 26, which circuit senses any vertical positional changes in rotor 24 via a second pickup or sensing coil 27. The entire assembly of outer rotor 11 and inner rotor 24 is encapsulated in a vacuum chamber 28.

A plurality of field coils 29, only two of which are shown, are placed in juxtaposition to the ferromagnetic portion 12 of rotor 11.

The upper or outer rotor 11 is suspended by the solenoid 15. The force supporting the rotor is proportional to the magnetic moment of the rotor times the vertical gradient of the magnetic field. The current through solenoid 15 is regulated by the servo-support circuit 23. If the rotor rises, the impedance of coil 22 changes, which change reduces the current through the solenoid thus reducing the field and returning the rotor to its original position. The downward movement of the rotor has a reverse effect upon the current through the solenoid. The horizontal position of rotor 11 is maintained by the shape of the rotor and the shape of the field, both being symmetrical about the vertical axis. The core 17 of solenoid 15 is supported by a wire 18, the length of which is adjustable, hanging as a pendulum in a dashpot of oil 24, which eliminates or damps horizontal motion. By employing proper circuitry for support circuit 23, the position of rotor 11 may be maintained very accurately. It has been found that the position may be maintained and adjusted within a wavelength of light. A suitable servo-support circuit is shown in FIG. 2 of Patent No. 2,691,306.

Rotor 24 is placed within the skirt 13 of rotor 11. The force of the ferromagnetic portion 12 of rotor 11 will act upon rotor 24 in much the same manner as the force from core 17 acts upon rotor 11. To prevent the rotors from flying together, solenoid 25 is placed around rotor portion 12 and the servo loop constituting solenoid 25, rotor portion 12, rotor 24, pickup coil 27 and support circuit 26, function in much the same manner as the servo loop described hereinbefore for regulation of the position of rotor 11. The horizontal damping of core 17 is found to be sufficient to prevent horizontal oscillation of both rotors 11 and 24.

By properly adjusting circuits 23 and 26, the position of rotors 11 and 24 is very stably maintained. Many types of sensing devices may be substituted for the coils 22 and 27, such as photoelectric sensors or capacitive pickup devices. The window 14 in the skirt 13 of rotor 11 is used as an optical aid in adjusting the position of rotor 24. A glass vacuum chamber 28 surrounds the rotating elements 11 and 24. A thin layer of gold coating may be used on the inner wall of chamber 28 which serves as a Faraday cage. The outer rotor 11 is driven by an alternating magnetic field created by field coils 29. The rotor 11 acts as a high resistance armature of an induction motor. A suitable circuit (not shown) for supplying this alternating drive is shown in Patent No. 2,691,306. Obviously, other circuits may be utilized.

The chamber 28 is partially evacuated. The residual air inside of the chamber of rotor 11 is used to drive the inner rotor 24. The chamber is then completely evacuated by freezing the gas therein with liquid helium. Alternately, rotor 24 is magnetically suspended in such a manner that the bottom thereof is allowed to rest very lightly on the bottom of the skirt 13 of rotor 11. As the rotor 11 starts rotation, speed is impared to rotor 24. When both rotor 11 and rotor 24 have attained the proper speed, and the field coils 29 are de-energized, rotor 24 is brought to its proper position within rotor 11 and thereafter remains in that position.

Another embodiment of the present invention is shown in FIG. 2 wherein the upper rotor 11 is supported by the upper solenoid 15 which also induces a magnetic moment therein. When the lower rotor 24 is brought in proximity to the upper rotor 11, it is supported by the magnetic moment of rotor 11. In order that the lower rotor does not fly into the upper rotor, a solenoid 25 is provided which solenoid forms a portion of the servo loop of rotor 24, pickup coil 27, servo support circuit 26 and the solenoid 25. A suitable iron core 31 is placed in coil 25 and serves to adjust the solenoid's field. Both rotors 11 and 24 are placed in vacuum chamber 28.

Thus, a double magnetic suspension has been described in which a rotor is magnetically suspended by a second rotor which in turn is magnetically suspended. Both rotors spinning at approximately the same speed in an evacuated chamber greatly reduce the rotor's deceleration. The skirt 13 of outer rotor 12 effectively provides a vacuum chamber which is rotating at a speed closely approaching that of the speed of rotation of the rotor 24. Therefore, any fluid that may remain within the vacuum chamber exhibits negligible drag upon freely rotating body 24. Experimentally, it has been found that $f/f$ is reduced to less than one part in $10^{-10}$ sec.$^{-1}$ where $f$ is the change in rotor speed $f$ per unit of time.

Obviously many modifications and variations of the present invention are possible in the light of the above teachings. It is therefore to be understood that within the scope of the appended claims the invention may be practiced otherwise than as specifically described.

What is claimed is:
1. A magnetic suspension system;
a first ferromagnetic rotor;
a second ferromagnetic rotor placed in close proximity to said first rotor;
a vacuum chamber encompassing said first and second rotor;
means for freely suspending said first rotor in said vacuum chamber;
means for freely suspending said second rotor in said vacuum chamber, said last mentioned means including said first rotor;
means for imparting a rotary force to said first rotor whereby a magnetic moment is induced in said second rotor causing rotation thereof.

2. A magnetic suspension system comprising:
a first rotor having a ferromagnetic portion and a non-conductive portion;
a second rotor placed within a chamber formed by the non-conductive portion of said first rotor;
a vacuum chamber encompassing said first rotor;
means for freely suspending said first rotor in said vacuum chamber;
means for freely suspending said second rotor within the chamber of said first rotor, said means including said first rotor;
means for imparting a rotary force to said first rotor whereby a magnetic moment is induced in said second rotor causing rotation thereof at approximately the speed of said first rotor.

3. The device of claim 2 wherein said means for suspending said first rotor includes:
a solenoid;
an iron core placed within said solenoid;
means for sensing the position of said first rotor and for feeding an error signal to a support circuit which controls the current through said solenoid.

4. A suspension system, comprising:
a first rotor;
a second rotor placed in close proximity to said first rotor;
means for freely suspending said first rotor;
means for imparting rotational force to said first rotor;
means including said first rotor for freely suspending said second rotor; and
a vacuum chamber encompassing said first and second rotors.

References Cited by the Examiner

UNITED STATES PATENTS 2,613,538 10/52 Edelstein _____ 74—5.37
2,857,767 10/58 Werndl _____ 74—5.37

MILTON KAUFMAN, *Primary Examiner.*

BROUGHTON G. DURHAM, *Examiner.*